United States Patent
Gerding et al.

(10) Patent No.: US 7,683,848 B2
(45) Date of Patent: Mar. 23, 2010

(54) ANTENNA FOR A LEVEL METER EMPLOYING THE RADAR PRINCIPLE

(75) Inventors: Michael Gerding, Herne (DE); Achim Matt, Duisburg (DE); Thomas Musch, Mulheim/Ruhr (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 12/034,096

(22) Filed: Feb. 20, 2008

(65) Prior Publication Data

US 2008/0204351 A1   Aug. 28, 2008

(30) Foreign Application Priority Data

Feb. 23, 2007   (DE) .................. 10 2007 009 363

(51) Int. Cl.
*H01Q 13/00*   (2006.01)
(52) U.S. Cl. ...................... 343/786; 343/785
(58) Field of Classification Search ................ 343/772, 343/785, 786
See application file for complete search history.

(56) References Cited

U.S. PATENT DOCUMENTS

| | | | | |
|---|---|---|---|---|
| 5,109,232 A | * | 4/1992 | Monte | 343/785 |
| 5,640,168 A | * | 6/1997 | Heger et al. | 343/786 |
| 5,880,698 A | * | 3/1999 | Burger | 343/772 |
| 6,097,346 A | * | 8/2000 | Fehrenbach et al. | 343/785 |
| 6,353,418 B1 | * | 3/2002 | Burger et al. | 343/786 |
| 6,499,346 B1 | | 12/2002 | Wien et al. | |
| 2002/0167452 A1 | * | 11/2002 | Sasaki et al. | 343/785 |
| 2003/0179148 A1 | * | 9/2003 | Ohlsson | 343/786 |
| 2005/0093759 A1 | * | 5/2005 | Louzir et al. | 343/786 |
| 2007/0188396 A1 | * | 8/2007 | Griessbaum et al. | 343/786 |

FOREIGN PATENT DOCUMENTS

| | | | |
|---|---|---|---|
| DE | 10 2005 022 493 A1 | | 11/2006 |
| EP | 0947812 A1 | | 10/1999 |

* cited by examiner

*Primary Examiner*—HoangAnh T Le
(74) *Attorney, Agent, or Firm*—Cesari and McKenna, LLP

(57) ABSTRACT

In an antenna for a level meter employing the radar principle, a fastening device is provided for detachably mounting a dielectric insert in the antenna. The fastening device may be a continuous clamping collar that clamps the dielectric insert in place in the antenna. This offers a simple, universally employable possibility for fastening a dielectric insert in the antenna.

3 Claims, 2 Drawing Sheets

ANTENNA FOR A LEVEL METER EMPLOYING THE RADAR PRINCIPLE

BACKGROUND OF THE INVENTION

This invention relates to an antenna, equipped with a dielectric insert, for use with a level meter that operates employing the radar principle.

A horn antenna for radar systems, its antenna cavity filled at least partly by a dielectric insert, has been described earlier, for instance, in DE 100 57 441 A1. Radar-type level meters utilizing that principle are used for measuring the level of liquids and granular materials. A microwave beam is transmitted via an antenna and is recaptured upon reflection off the surface of the medium being measured. The level of the medium can be calculated, for instance, by means of a runtime measurement.

As described in DE 100 57 441 A1, there are various applications for which the antenna of a radar-based level meter needs to be equipped with a dielectric insert. According to the description in that publication, the dielectric material is applied, for example, by being molded into the antenna interior. That publication also describes how the dielectric insert is bonded in an antenna by a baking or sintering process. That publication continues to describe the coating of the outer surface of the dielectric insert with a conductive layer as proposed, for instance, in DE 196 17 963 A1.

In practical use, however, it has been found that any such bonding is fraught with problems in that it either has a negative effect on the dielectric properties, and thus for instance on the beam characteristics of the antenna, or, depending on the type of bonding, only certain dielectric materials can be used.

SUMMARY OF THE INVENTION

Against the background of these problems, our objective has to be the introduction of a simple and universally employable method for fastening a dielectric insert in an antenna.

For an antenna of the type first described above, this objective is achieved in that the antenna is provided with internal means for detachably mounting the dielectric insert.

The invention thus constitutes a departure from the principle of providing the antenna with an essentially permanent dielectric liner. Instead, the insert is to be removably attached by means of a fastening device that ensures a dependable retention of the dielectric insert in the antenna.

This invention is essentially suitable for use on all-dielectric antennas as well. However, in a preferred embodiment of the invention, the antenna is made of metal. The invention also lends itself to a variety of antenna configurations. In a preferred embodiment of the invention, however, the antenna is a horn antenna.

For all practical purposes, the dielectric insert described herein may fill only part of the interior of the antenna. However, in a preferred embodiment of the invention, the dielectric insert fills the entire interior of the antenna.

The fastening devices for the detachable mounting of the dielectric insert in the antenna may be configured along a variety of functional and physical parameters. In a preferred embodiment of the invention, for example, the fastening device may be in the form of a clamping collar that serves to clamp the dielectric insert in the antenna. That clamping collar is preferably molded onto the dielectric insert as an integral part thereof, meaning that the collar consists of the same material as the dielectric insert.

While it is possible to limit the clamping collar to a partial section of the circumference of the dielectric insert, the clamping collar in a preferred embodiment of the invention extends over the entire outer circumference of the dielectric insert, preferably engaging in a clamping recess formed in the insert.

Alternatively, according to one preferred embodiment of the invention, the clamping collar may be in the form of an O-ring placed between the inner wall of the antenna and the outer wall of the dielectric insert. In that case, both the inner wall of the antenna and the outer wall of the dielectric insert are preferably provided with a corresponding recess, preferably a continuous groove in which the O-ring engages.

As another choice, the fastening device in a preferred embodiment of the invention is in the form of a screw connection between the outer wall of the dielectric insert and the inner wall of the antenna. A screw connection of that kind will typically be provided in a cylindrical section of the dielectric insert and, when the dielectric insert is in place, will be located in a corresponding cylindrical section of a waveguide that feeds the electromagnetic signal to the antenna.

In another preferred embodiment of the invention, the fastening device may be in the form of a set screw that is mounted in the antenna wall and presses on the outer wall of the dielectric insert. A set screw of this type is preferably accessible from outside the antenna to permit easy adjustment. Preferably also, several such set screws are provided, desirably with even circumferential spacing.

Finally, in another preferred embodiment of the invention, the fastening device is in the form of a spring assembly provided on the inner wall of the antenna and pressing against the outside wall of the dielectric insert. In this case as well, preferably several such spring assemblies are provided, again most desirably with even circumferential spacing.

The following description will detail preferred embodiments of the invention with reference to the attached drawings.

DESCRIPTION OF THE PREFERRED EMBODIMENTS

Figure 1:
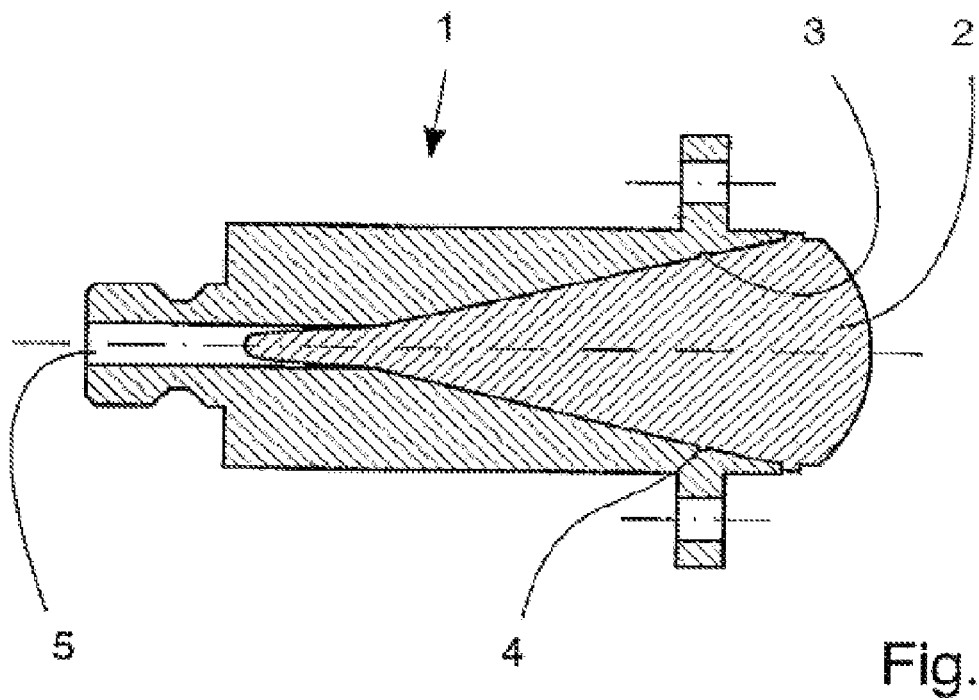
FIG. 1 is a schematic longitudinal sectional view of an antenna for a radar-type level meter according to a first preferred embodiment of the invention.

FIG. 1 is a longitudinal section view of an antenna for a radar-type level meter. The antenna is a horn antenna 1 in which a dielectric PTFE insert 2 is installed. The dielectric insert 2 is mounted in the horn antenna 1 in removable fashion, the fastening device in this case being a continuous clamping collar 3. This clamping collar 3 is integrally molded onto the outer wall of the dielectric insert 2 and consists of the same PTFE material. The inner wall of the horn antenna 1 is provided with a clamping recess 4 matching and accepting the clamping collar 3.

When the horn antenna 1 is made of a metal such as stainless steel and the dielectric PTFE insert 2 is shaped as described above, a certain degree of elasticity and compressibility of the PTFE material allows the dielectric insert 2 to be snapped into the inside of the horn antenna 1 when a light axial pressure is applied.

To loosen the dielectric insert 2 so that it can be removed from the horn antenna 1, for instance, a suitable rod can be used to push against the dielectric insert 2 from the waveguide and of the horn antenna 1, which is the end at which a waveguide 5 connects to the horn antenna 1 for feeding-in the microwave signal, i.e. the left end in FIG. 1.

Figure 2:
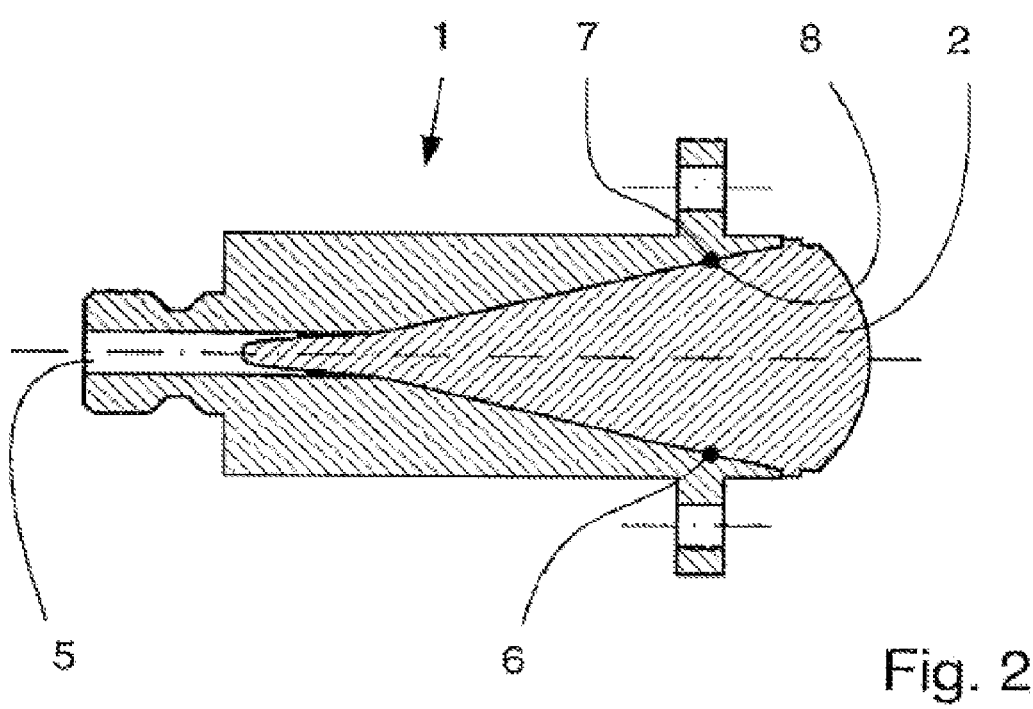
FIG. 2 is a schematic longitudinal sectional view of an antenna for a radar-type level meter according to a second preferred embodiment of the invention.

FIG. 2 shows an antenna according to a second preferred embodiment of the invention, in this case with a continuous O-ring 6 serving as the clamping collar. The O-ring 6, consisting, for example, of a fluorinated elastomer, engages in corresponding continuous grooves 7, 8 in the horn antenna 1 and, respectively, in the dielectric insert 2. The procedure for attaching and removing the dielectric insert 2 is the same as that described for the first preferred embodiment of the invention.

Figure 3:
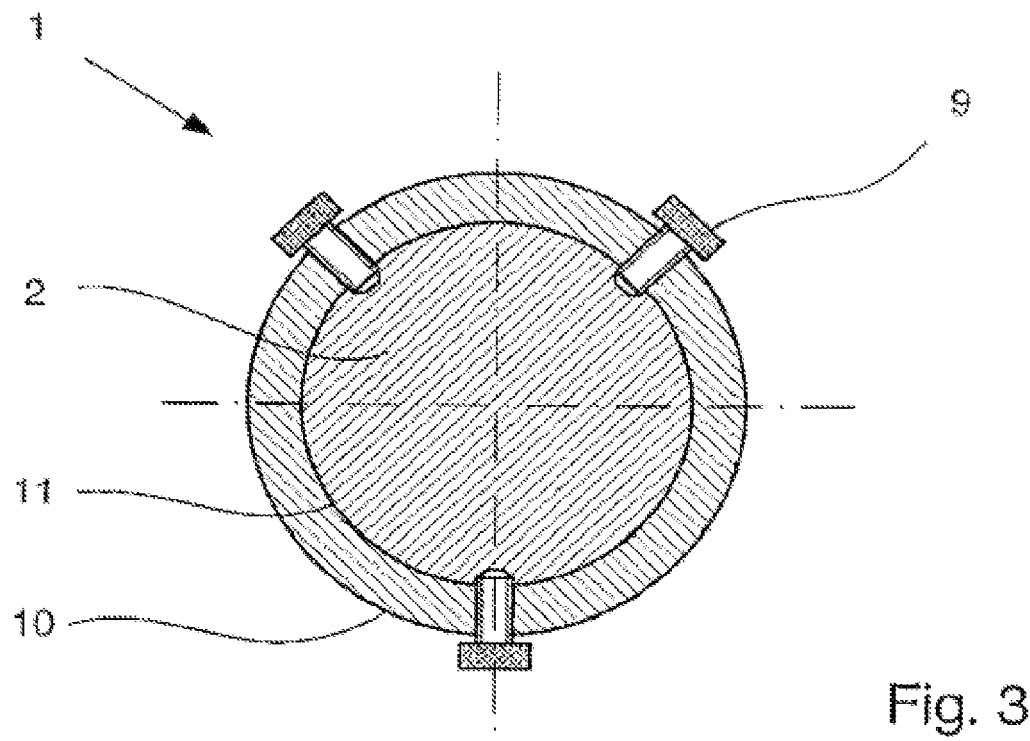
FIG. 3 is a schematic cross-sectional view of an antenna for a radar-type level meter according to a third preferred embodiment of the invention.

FIG. 3 is a schematic illustration in cross-section showing how, in a third preferred embodiment of the invention, the dielectric insert 2 is fastened in the horn antenna 1 by means of set screws 9. As shown in FIG. 3, the set screws 9 extend through the wall 10 of the horn antenna 1 so that they can be tightened to clamp down on the outside wall 11 of the dielectric insert 2. These set screws are conveniently accessible from the outside, thus permitting easy manipulation.

Figure 4:
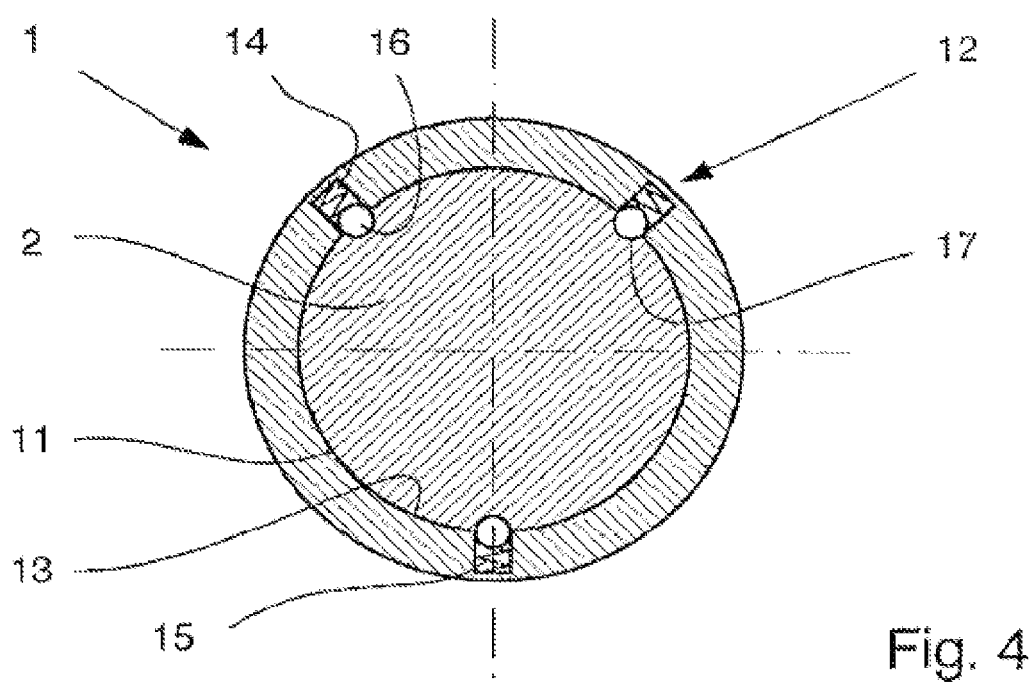
FIG. 4 is a schematic cross-sectional view of an antenna for a radar-type level meter according to a fourth preferred embodiment of the invention.

Finally, FIG. 4 shows an antenna according to a fourth preferred embodiment of the invention, wherein the dielectric insert 2 is removably held in place in the horn antenna 1 by means of spring-loaded retainers 12, provided in the inner wall 13 of the horn antenna 1. For this, the inner wall 13 of antenna 1 features recesses 14 that can fully accommodate the springs 15 and the spring-loaded retaining balls 16 of the spring-loaded retainer assemblies 12. This allows the dielectric insert 2 to be snapped into the horn antenna 1 with only minor axial pressure. The dielectric insert 2 will be held in place in the horn antenna 1 by the spring-loaded retaining balls 16 as these click into corresponding concave detents 17 in the outer wall 11 of the dielectric insert 2. In this fashion, it is also possible to ensure a specific rotational alignment of the dielectric insert 2 in the horn antenna 1.

The invention claimed is:

1. A horn antenna for a level meter employing the radar principle, with a dielectric insert, wherein a fastening device is provided for the removable attachment of the dielectric insert in the antenna, said fastening device being a spring assembly provided on an inner wall of the antenna and which presses against an outer wall of the dielectric insert, said spring assembly comprising a spring and a spring-loaded retaining ball which clicks into corresponding concave detents in the outer wall of the dielectric insert.

2. The antenna as in claim 1, wherein the antenna is of metal.

3. The antenna as in claim 1, wherein the dielectric insert completely fills the interior space of the antenna.

\* \* \* \* \*